(12) United States Patent
Amarilio et al.

(10) Patent No.: US 11,933,978 B2
(45) Date of Patent: Mar. 19, 2024

(54) ELECTRONIC DISPLAY DESIGNED FOR REDUCED REFLECTIONS

(71) Applicant: ELBIT SYSTEMS LTD., Haifa (IL)

(72) Inventors: Errikos Amarilio, Kiryat Ata (IL); Yolanda Landesberg, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 14/772,089

(22) PCT Filed: May 18, 2014

(86) PCT No.: PCT/IL2014/050433
§ 371 (c)(1),
(2) Date: Sep. 2, 2015

(87) PCT Pub. No.: WO2014/188411
PCT Pub. Date: Nov. 27, 2014

(65) Prior Publication Data
US 2016/0062114 A1    Mar. 3, 2016

(30) Foreign Application Priority Data
May 19, 2013   (IL) .......................................... 226434

(51) Int. Cl.
*G02B 27/01*   (2006.01)
*G02B 5/02*   (2006.01)
*G02B 27/00*   (2006.01)

(52) U.S. Cl.
CPC ....... *G02B 27/0101* (2013.01); *G02B 5/0231* (2013.01); *G02B 27/0081* (2013.01);
(Continued)

(58) Field of Classification Search
CPC ........... G02B 27/0081; G02B 27/0093; G02B 27/01; G02B 27/0101; G02B 27/0154;
(Continued)

(56) References Cited

U.S. PATENT DOCUMENTS

| 4,807,965 A |   | 2/1989 | Garakani |           |
|-------------|---|--------|----------|-----------|
| 4,936,657 A | * | 6/1990 | Tejima ..................... | G02B 3/08 |
|             |   |        |          | 348/E5.141 |

(Continued)

FOREIGN PATENT DOCUMENTS

| DE | 11 2012 002308 | 2/2014 |
|----|---------------|--------|
| EP | 0415275       | 3/1991 |

(Continued)

OTHER PUBLICATIONS

International Search Report of PCT Application No. PCT/IL2014/050433 dated Sep. 23, 2014.

(Continued)

*Primary Examiner* — Derek S. Chapel
*Assistant Examiner* — Adam W Booher
(74) *Attorney, Agent, or Firm* — PEARL COHEN ZEDEK LATZER BARATZ LLP

(57) ABSTRACT

An optical system that reduces reflections from an electronic display is provided herein. The optical system may include an electronic display; and a light directing medium configured to steer a plurality of viewing cones into an eye motion box facing said display so that said viewing cones overlap at least partially at the eye motion box plane, wherein a viewing cone is a geometric location only within which a viewer can see light coming from said electronic display.

5 Claims, 9 Drawing Sheets

(52) U.S. Cl.
CPC ...... *G02B 27/0179* (2013.01); *G02B 27/0093* (2013.01); *G02B 2027/012* (2013.01); *G02B 2027/0181* (2013.01); *G02B 2207/123* (2013.01)

(58) Field of Classification Search
CPC ........... G02B 27/0159; G02B 27/0179; G02B 27/09; G02B 27/0905; G02B 27/0944–0994; G02B 5/0231; G02B 5/045; G02B 5/18–1819; G02B 5/1828; G02B 5/1861; G02B 5/1866; G02B 5/1876; G02B 5/32; G02B 2027/012; G02B 2027/0181; G02B 2027/0183; G02B 2027/0185; G02B 2027/0187; G02B 2027/123; G02B 2005/1804; G02B 26/08; G02B 26/0808; G02B 26/0816; G02B 26/0833; G02B 26/0875–0891; G02B 26/10–123

See application file for complete search history.

(56) References Cited

U.S. PATENT DOCUMENTS

| | | |
|---|---|---|
| 6,449,094 B1 | 9/2002 | Ishii |
| 8,308,329 B1 | 11/2012 | Sethna |
| 2003/0067432 A1* | 4/2003 | Watanabe ............... B60K 35/00 345/87 |
| 2005/0013005 A1 | 1/2005 | Rogers |
| 2006/0291243 A1 | 12/2006 | Niioka et al. |
| 2011/0080538 A1 | 4/2011 | Shiota et al. |
| 2011/0216407 A1* | 9/2011 | Olaya ................... H04N 13/305 359/463 |
| 2014/0266979 A1* | 9/2014 | Miener ................... B64C 13/04 345/1.3 |

FOREIGN PATENT DOCUMENTS

| | | |
|---|---|---|
| JP | S57-141602 | 9/1982 |
| JP | 2002 311425 | 10/2002 |
| JP | 2005-234096 | 9/2005 |
| JP | 2007-003951 | 1/2007 |
| JP | 2009-217259 | 9/2009 |
| WO | WO 2009/158647 | 12/2009 |
| WO | WO 2012/164795 | 12/2012 |

OTHER PUBLICATIONS

Office Action of Israeli Application No. 226434 dated Jul. 6, 2014.
Extended Search Report of European Patent Application No. 14801465.7, dated Nov. 25, 2016.
Office Action for Japanese Application No. 2016-513492, dated Feb. 13, 2018.
Office Action for European Patent Application No. 14801465.7, dated Feb. 1, 2021.
Hearing Notice in reference of Indian Patent Application No. 5067/CHENP/2015, dated Apr. 10, 2023.

* cited by examiner

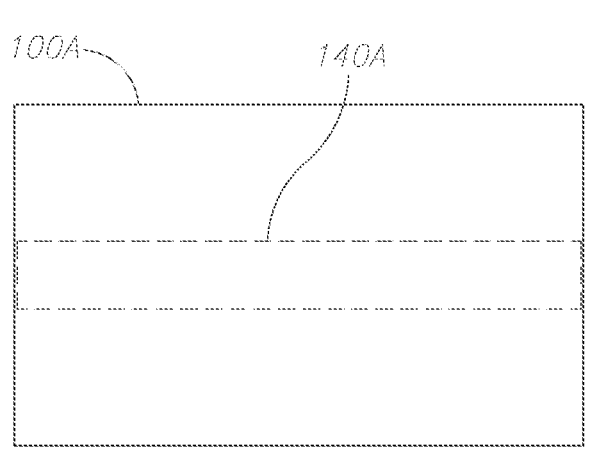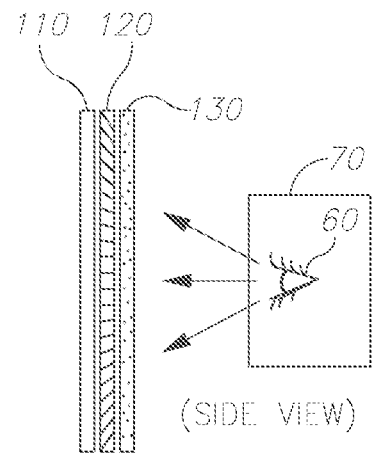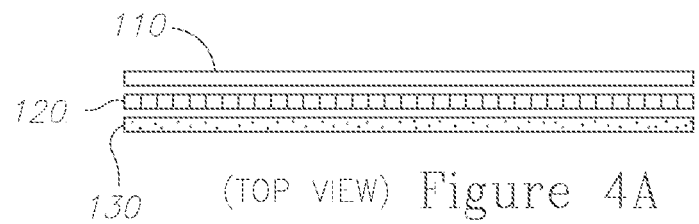
(TOP VIEW) Figure 4A
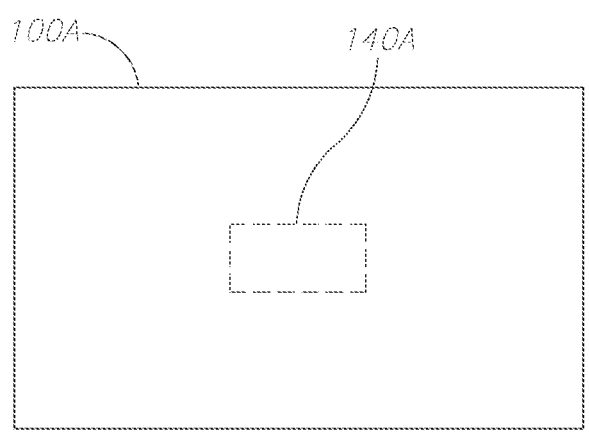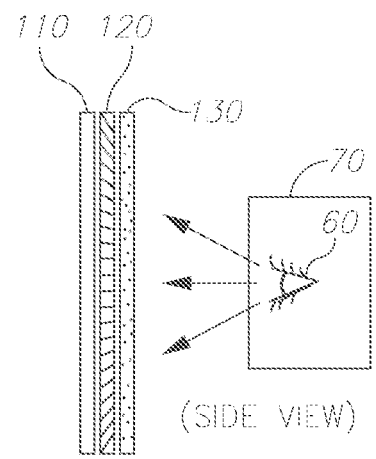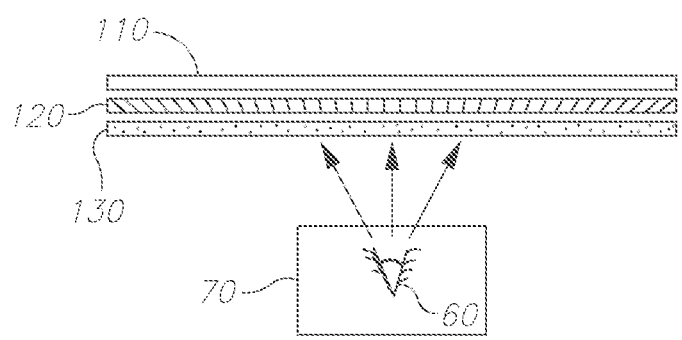
(TOP VIEW) Figure 4B

ELECTRONIC DISPLAY DESIGNED FOR REDUCED REFLECTIONS

CROSS-REFERENCE TO RELATED APPLICATIONS

This application is a National Phase Application of PCT International Patent Application No. PCT/IL2014/050433, International Filing Date May 18, 2014, entitled: "ELECTRONIC DISPLAY DESIGNED FOR REDUCED REFLECTIONS", published on Nov. 27, 2014 as International Patent Application Publication No. WO 2014/188411, claiming priority of Israel Patent Application No. 226434, filed May 19, 2013, both of which are incorporated herein by reference in their entireties.

FIELD OF THE INVENTION

The present invention relates to electronic displays and more particularly, to such displays that produce reduced level reflections from ambience.

BACKGROUND OF THE INVENTION

In recent years, there is a growing need to introduce Large Area Displays (LAD) in critical applications. One of the most demanding applications for LAD is in the cockpit of aircraft. There is growing and insatiable need in presenting flight information, navigation information, and sensor and mission information. Traditionally, the classical solution for such cockpits was the use of several Multi-Function-Displays (MFD). The installation of multiple displays results in a very rigid layout and formatting of the displayed images. Since the size of the display is given, the information format is given. This method tends to be prohibiting in adding additional images. On the other hand the introduction of Large Area Displays allows the dynamic allocation of display area in accordance with specific needs, as they vary in accordance with the flight stage.

The installation of ever larger displays in aircraft cockpits increases the light emitted by the displays and gets reflected from the aircraft canopy. At night, such reflections are undesirable because they clutter the view of the darkened scene outside the aircraft canopy. A cockpit display and the design pilot eye position and the eye motion box define a viewing cone though which the display may be viewed. It is important to note that the light emitted from the display beyond the viewing cones is clocked or severely reduces so that viewing the light coming from the display beyond the viewing cone is not possible.

FIG. 1 depicts a cockpit 10 which contains such a LAD 14 according to the currently available technology. As can be seen, light beams 14A-14C coming from LAD 14 might be undesirably reflected by canopy 12 onto the eyes of pilot 22 sitting at cockpit 10 causing undesirable light clutter. Due to the unique geometry of canopy 12, the problem becomes even more severe when a co-pilot or a navigator 24 sits in tandem with pilot 22 as reflections coming from LAD 12 such as 16A and 16B may be even worse.

FIGS. 2A and 2B illustrate one known solution addressing the aforementioned reflection challenge according to the prior art. In these displays 20, the light is steered by light directing elements from the display on a predefined viewing envelope 40. Typically, the viewing cone as shown in FIG. 2B is defined by the worst case viewing angles φ1, φ2 of the display 20 from an eye motion box 30 that defines the viewers (e.g., pilot) possible eye position. This viewing cone is applied to every single point of the display area, thus the light emitted from the display 20 washes a much larger cone 40 than the minimum needed for the eye motion box 30 as shown in FIG. 2B. The aforementioned solution may be proved satisfactory only for legacy small area displays in which the difference between the display extreme areas is relatively small.

FIG. 3A illustrates another solution for the reflection problem according to the prior art. A light steering medium 300 possibly made of a bundle of edge shaped optical fibers e.g. 310, 302, 303 is used for light steering into viewing cones A, B, and C (304, 305, and 306). As can be seen, the light coming from the display (or the backlight) on the left is being steered into cones to a viewer at the right. However, due to the use of optical fibers which are limited in the opening angle of the light flowing through then and the minimal width of light steering medium 300, it would be impossible to get cone A, B, and C overlap in a specified eye motion box in a case the display is a LAD.

It would be therefore advantageous for LADs located in canopies emit the light at different viewing angles on each point on the display surface and to direct the light onto the actual viewing angle.

SUMMARY OF THE INVENTION

One aspect of the invention provides a system that reduces reflections originated at a display and reflected by a canopy surrounding the display. The system may include an electronic display, and a light directing medium configured to steer a plurality viewing cones into an eye motion box having specified dimensions so that the reviewing cones overlap at the eye motion box plane.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 4A and 4B are block diagrams illustrating aspects in accordance with embodiments of the present invention;

Figure 1:
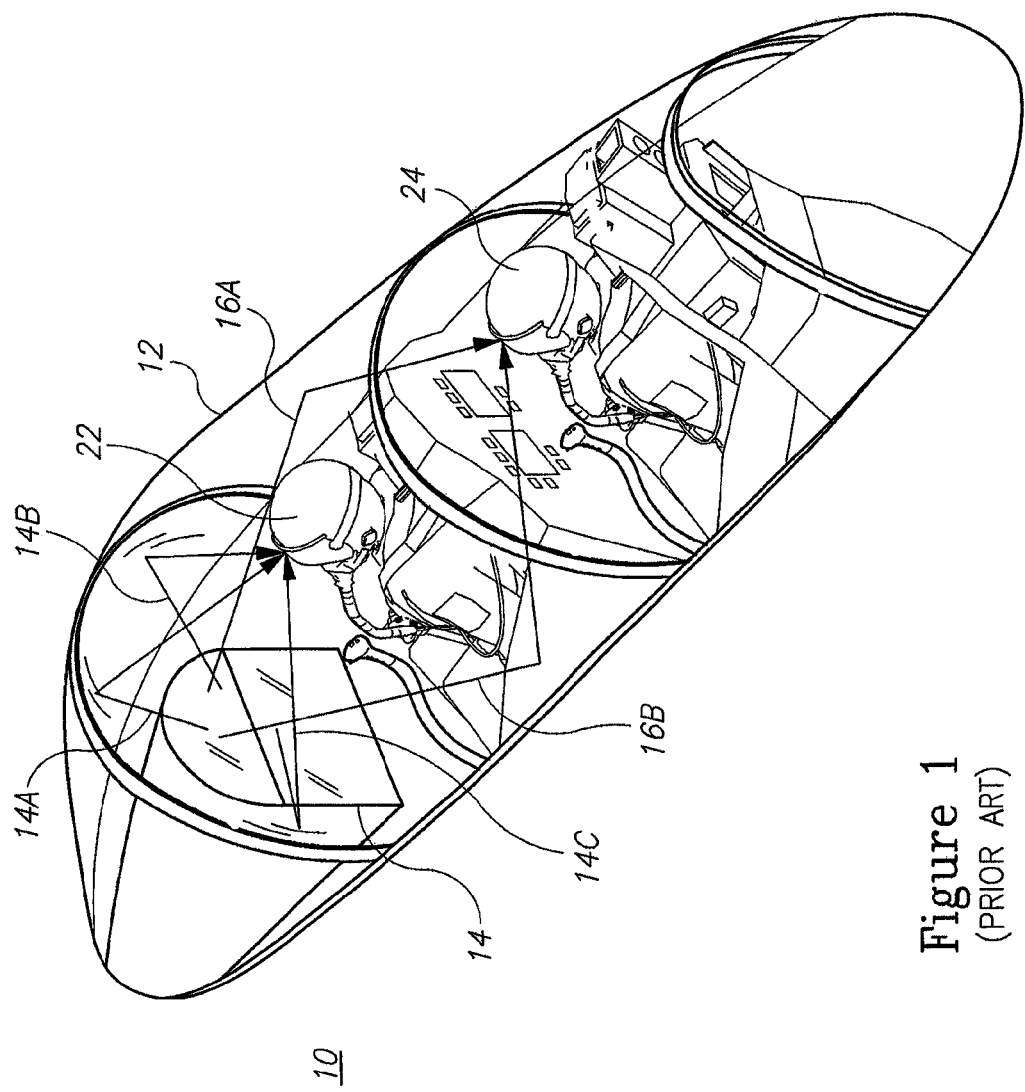
FIG. 1 is a perspective view showing an exemplary environment of a large area display illustrating an aspect in accordance with the prior art.
Figure 2A:
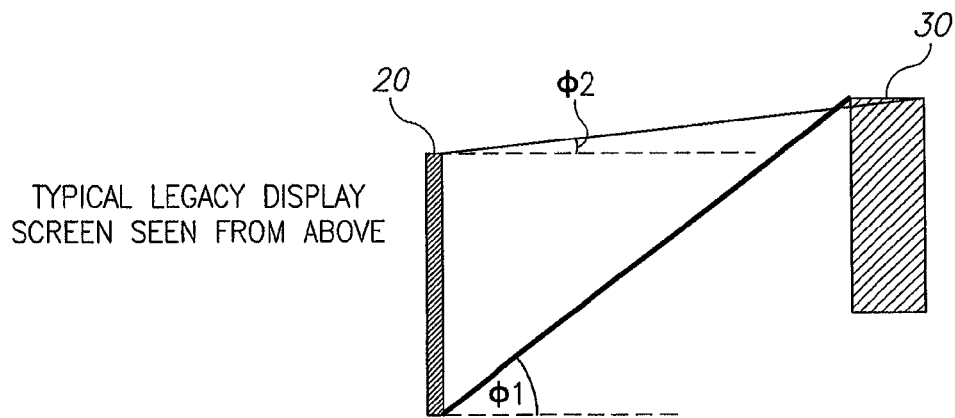
FIGS. 2A and 2B are block diagrams illustrating aspects in accordance with the prior art.
Figure 2B:
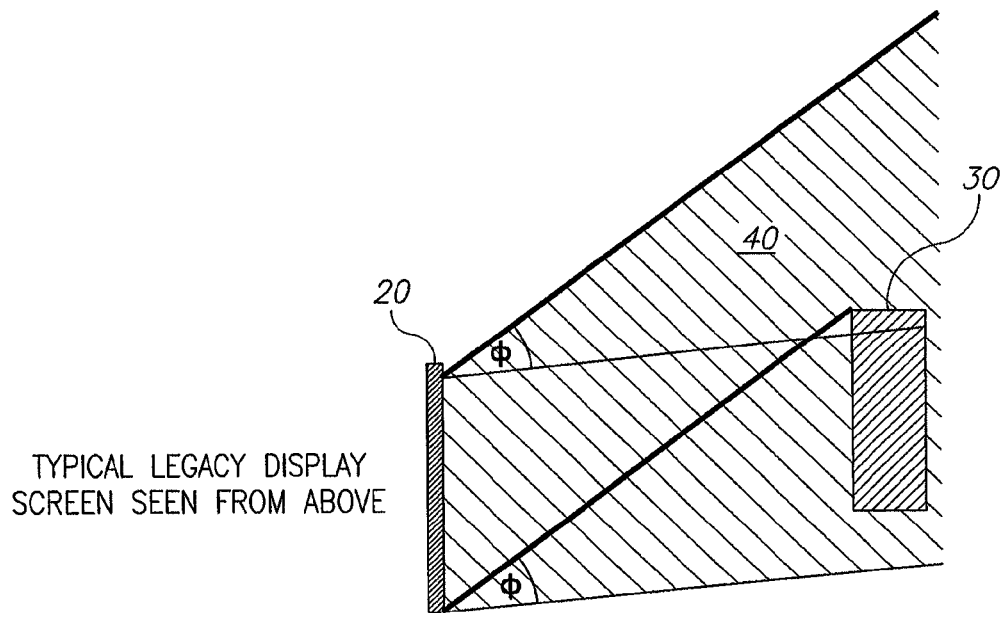

The drawings together with the following detailed description make apparent to those skilled in the art how the invention may be embodied in practice.

DETAILED DESCRIPTION OF THE INVENTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 3A:
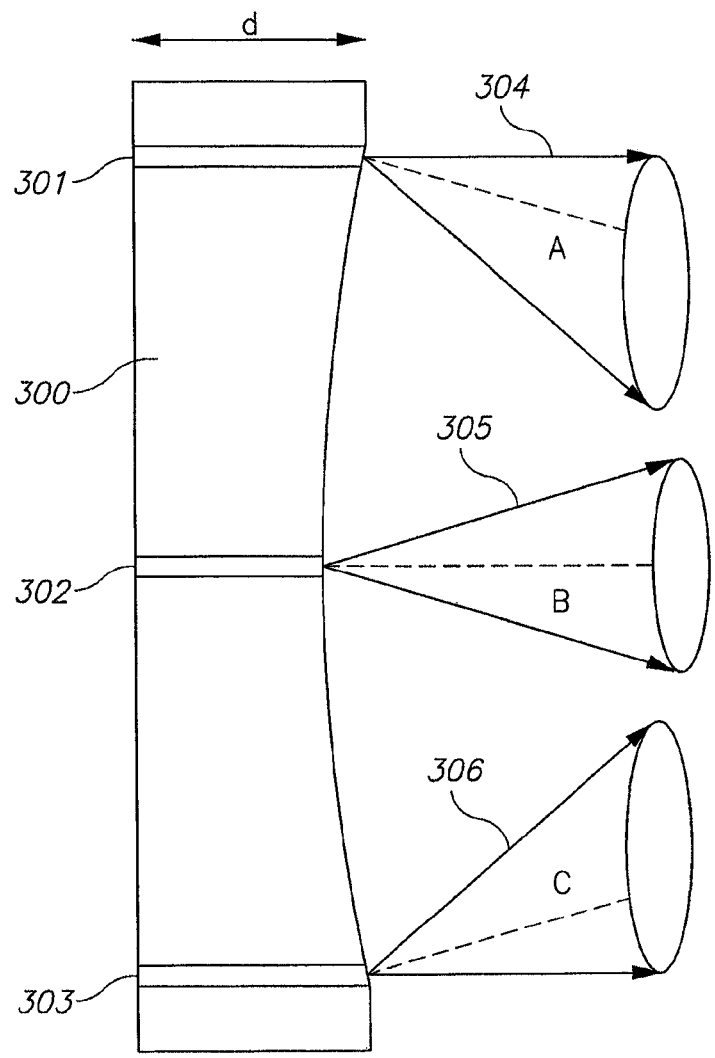
FIG. 3A is a block diagram illustrating one aspect in accordance with the prior art.
Figure 3B:
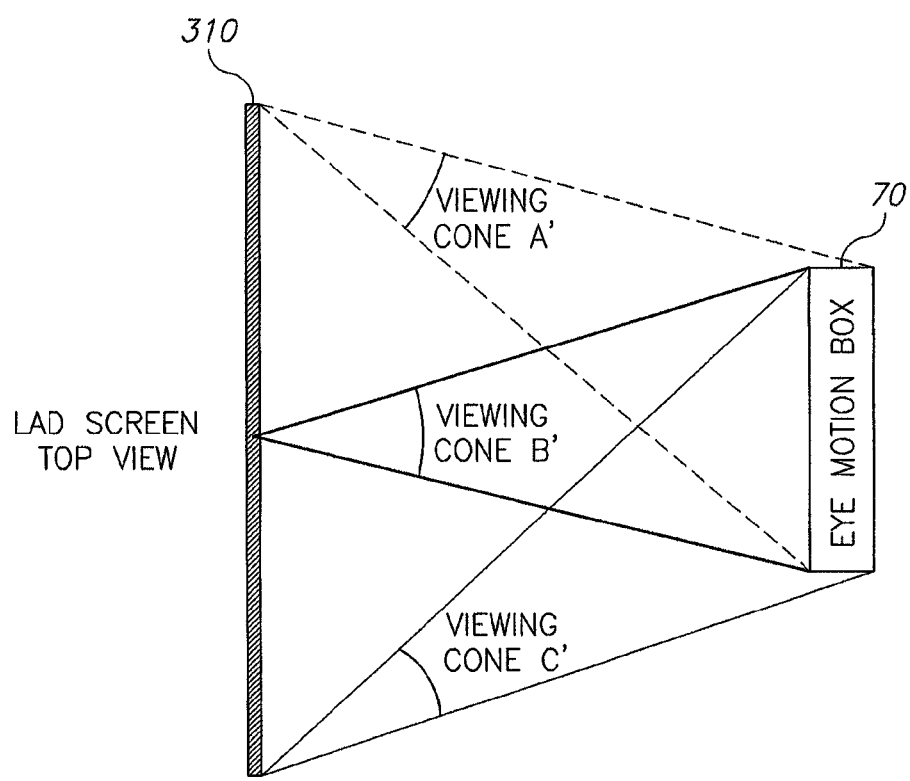
FIG. 3B is a block diagram illustrating one aspect in accordance with embodiments of the present invention.

FIG. 3B is a block diagram illustrating one aspect in accordance with embodiments of the present invention. A display 310 having light steering medium is configured to emit light in viewing cones A', B' and C' directed at an eye motion box 70 in front of it so that the cones overlap at their base. The display light emission angle may vary over the display surface. Thus every point on the display surface emits light to predefined angles that match eye motion box 70. Obviously, if the light is minimized outside the individual viewing cones, all of the light of the display is illuminated to the pilot's eyes and minimum light hits the canopy.

According to some embodiments of the present invention a spatially variable illuminating cone of the display is provided over its surface to match the eye motion box 70. It is understood that various implementations of this concept may be used. Some not-limiting examples include using light directing foils, or backlight directed lighting.

FIGS. 4A and 4B are block diagrams illustrating aspects in accordance with embodiments of the present invention. Array of optical steering medium of display 100A may be implemented as a one dimensional array of micro louvers 120 (being elongated surfaces, usually but not necessarily of a rectangular shape) each tilted at a specified angle so that light coming from the display is blocked by the louvers at any other than its respective specified angle. A varying viewing angle can be achieved if the louvers are made in varying viewing angles along the surface of the display. The array of micro louvers 120 may be located between backlight 110 and LCD cells 130A. Eye motion box 70 and eye of the observer 60 are shown for reference with the borders 140A as contained within display 100A.

The exact design of the louvers size, position and orientation different viewing angles can be achieved throughout the display surface. It should be understood that these louvers are very small, the entire thickness of the foil is tenths of millimeters.

Overlay of two different (or more foils) may be desirable for controlling the light emissions super positioned one on top of the other with differing axes, so that the control of the light emissions is in several axes (for example vertical and horizontal)

A different method for directing light can be achieved with special microprisms arranged in a similar fashion like the louvers and several other light directing techniques.

The entire viewing cone has to be satisfied in both the horizontal and vertical viewing cones. Again this can be accomplished by using one or more layers of light directing foils. Again as an example, two different louvers foils, one directing the light vertically and one directing horizontally accomplish the required overall viewing cone light direction.

Advantageously, the use of a fully optimized, continuous variable viewing angle solution may be substituted with sectorial uniform light directing. In this case, a display surface is subdivided to two or more sectors, while on each sector a different light direction is implemented.

In the previous example of the louvers, louver foils may be positioned in the selected areas, thus changing the light direction per sector. According to some embodiments, the use of light directing foils may be further compensated with backlights with variable spatial brightness.

Another method for achieving such a spatially adapted viewing cones is a structure consisting of two elements, an effectively collimating medium and a imaging optics steering medium FIG. 4B is a block diagram illustrating another aspect in accordance with embodiments of the present invention. Here, the array of optical channel elements 120 is a two dimensional array of micro louvers. Array 120 includes a first set of parallel micro louvers and a second set of parallel micro louvers perpendicular to the first set. In order to achieve the effect of directing the light coming from the display in two dimensions onto eye motion box, each one of the micro louvers is tilted at a specified angle so that light coming from the display is blocked by the louvers at any other than its respective specified angle thus acting as a collimating medium.

Figure 5:
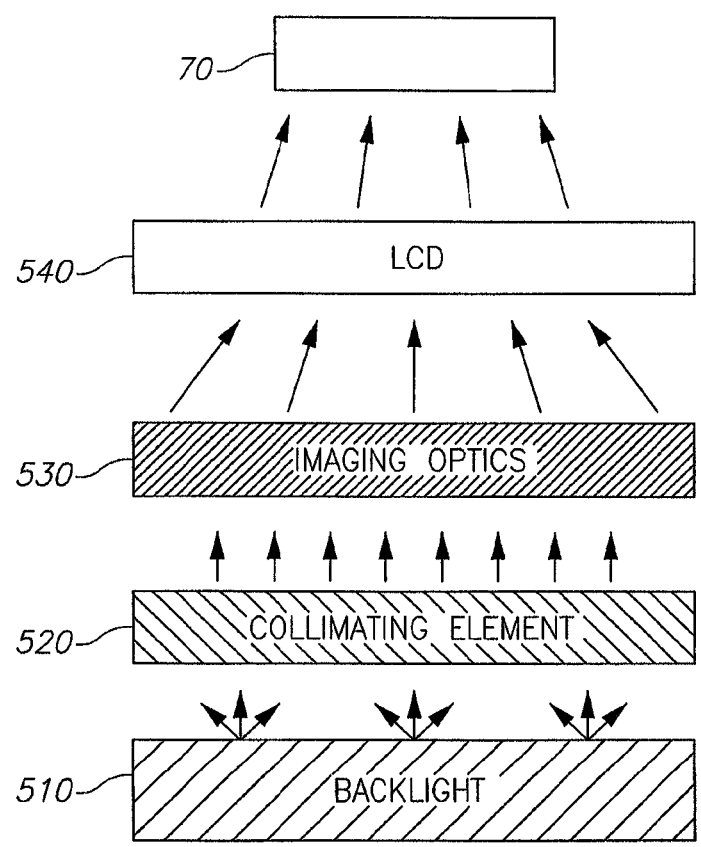
FIG. 5 is a block diagram illustrating yet another aspect in accordance with embodiments of the present invention.

FIG. 5 is a block diagram illustrating yet another aspect in accordance with embodiments of the present invention. Optical arrangement 500 illustrates elements which have been distanced to show the light paths. The optical layout 500 may include a backlight medium 510 is coupled to a collimating medium 520 which is coupled to an imaging optic 530 (light steering medium) and LCD cells 540 all facing an eye motion box 70.

In operation, collimating medium 520 steers and bends the light rays from the backlight 510 to a parallel (collimated) light. The imaging optics 530 receives the parallel (collimated) light and "focuses" it towards the user (pilot) in a similar fashion as a lens would. The collimating element may be any medium that effectively generates a collimated (parallel) beam. Any structure that acts like a lens with a focal length equal to the distance of the lens from the backlight emitting structure may achieve this, such as a micro lens array foil or plate. This may also be generated with standard structures that limit the exit angles of light incident to the backside such as a fiber-optic plate with small numerical aperture or the superimposition of perpendicular louver foils with sharp cut-off angles, and the like. In practice, the collimation will be designed to allow for some dispersion, so that the viewing from the eye motion box will allow viewing of the entire display.

Figure 6:
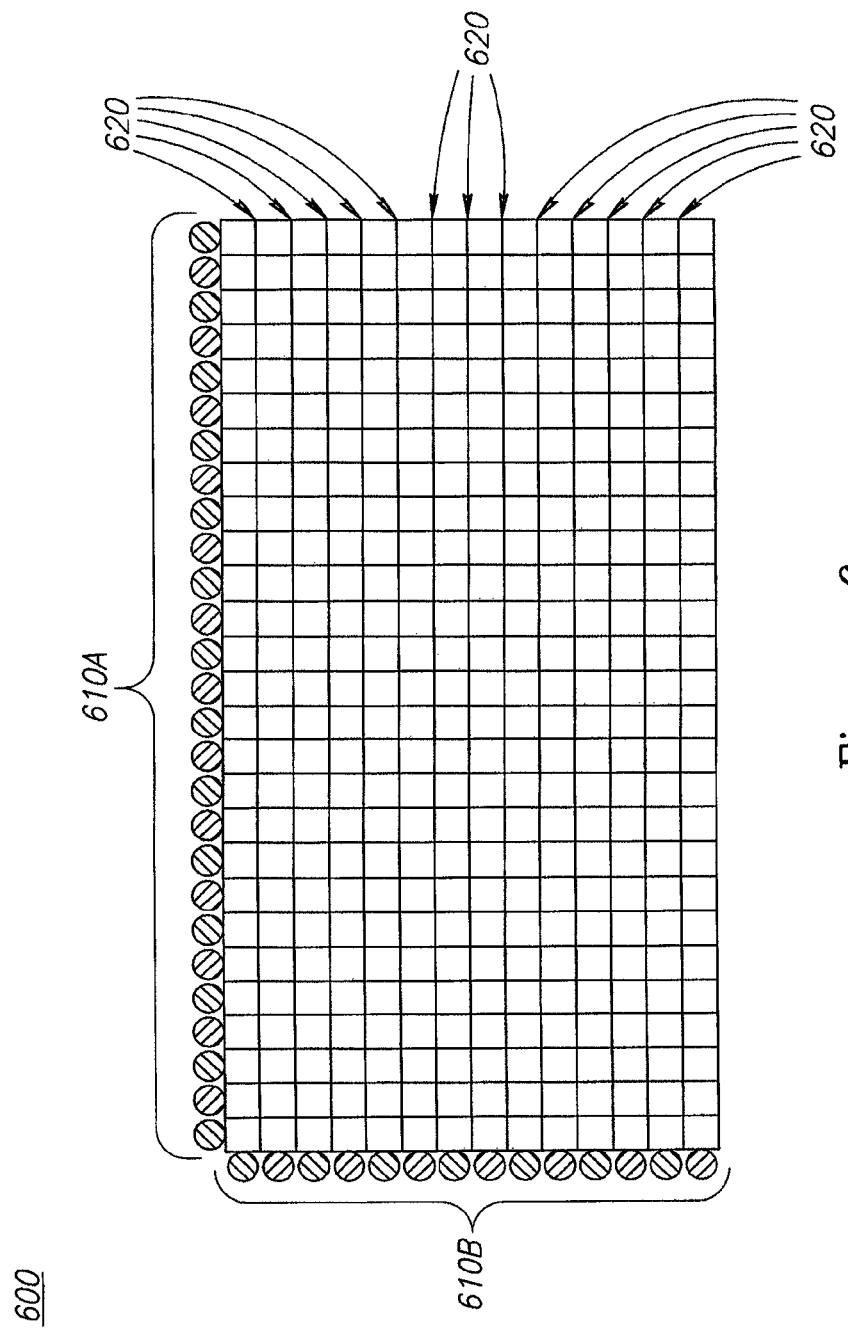
FIG. 6 is a block diagram illustrating yet another aspect in accordance with embodiments of the present invention.

FIG. 6 is a block diagram illustrating yet another aspect in accordance of display 600 with embodiments of the present invention. Here, a dynamic embodiment is suggested according to which the viewer plane can be adjusted or completely altered over time, responsive to the viewer selection or automatically based on predefined parameters that may change over time, such as airplane orientation, lighting conditions, and viewer preferences or profile. In order to achieve this end, the system further include means 610A and 610B for dynamically altering the optical channel elements 620 so that the light directed through them is detected onto a second viewer plane. That may be an adjustment of the original viewer plane or a completely non-overlapping with the original eye motion box One exemplary non limiting implementation of the dynamic embodiment is with optical channels elements in the form of micro louvers such as and using means for dynamically altering the light channel elements in the form of electro mechanical drivers 610A and 610B.

Figure 7A:
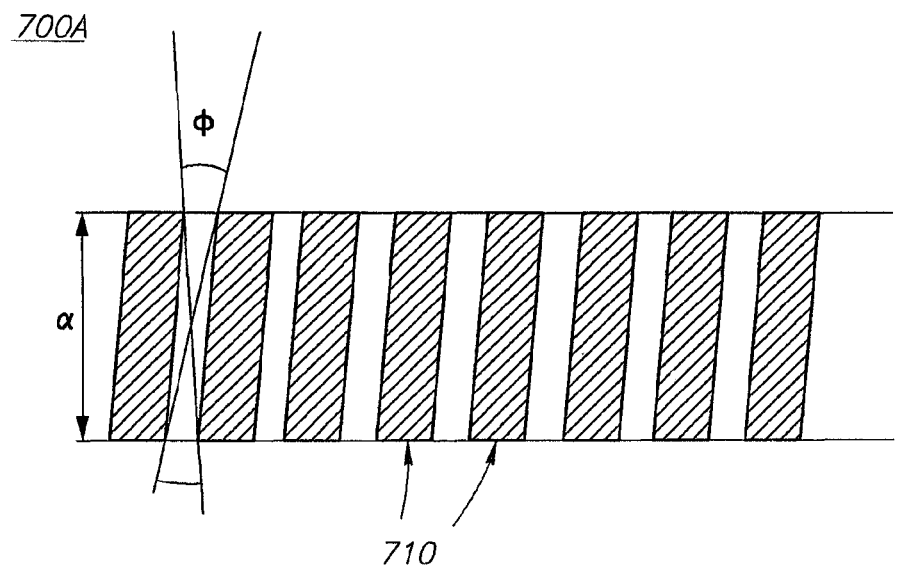
FIGS. 7A and 7B are diagrams illustrating aspects in accordance with embodiments of the present invention.
Figure 7B:
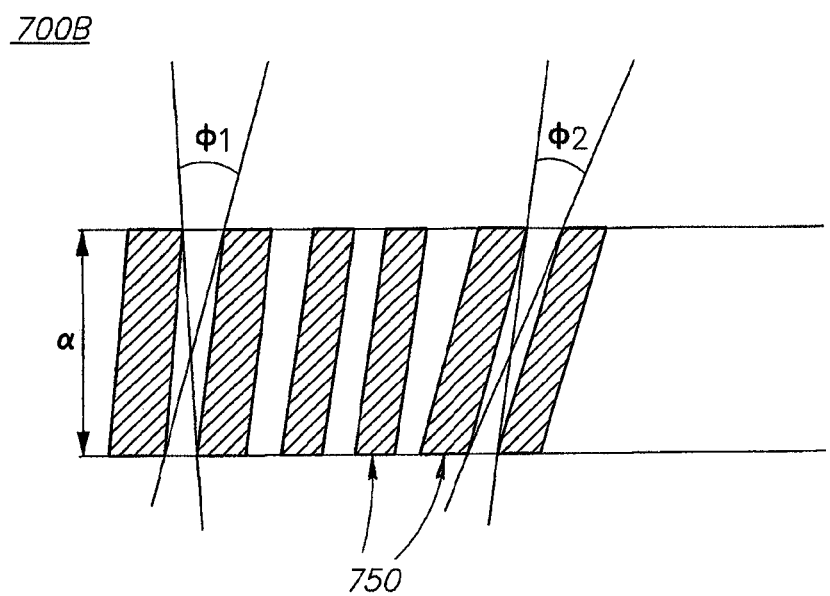

FIGS. 7A and 7B are diagrams illustrating aspects in accordance with embodiments of the present invention of implementing the light steering medium. For example, a way known in the art of directing light is the use of a louver foils 700A and 700B. This foil of thickness a may include opaque microstructures 710, 750 that will allow the light to pass only through certain angles. In this figure the light will pass only through the angle D of louvers surface 120. The dimensions of the louvers define the viewing angle. Typical louver foils are widely available and are uniform. Thus, the light emitted is only directed to the viewing angle throughout the display surface.

Figure 8:
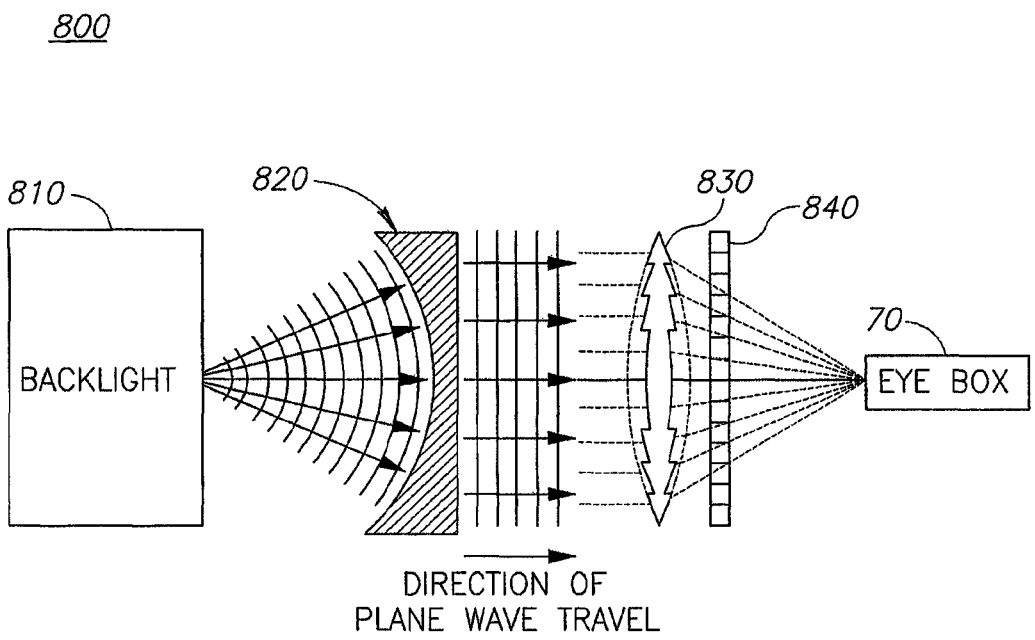
FIG. 8 is an optical diagram illustrating yet another aspect in accordance with embodiments of the present invention.

FIG. 8 is an optical diagram illustrating yet another aspect of electronic display 800 in accordance with embodiments of the present invention. As explained above, the imaging optics 830 may include special micro-structured elements that will generally focus the light to a specific distance and angle from their surface. This may be in its simplest form a Fresnel lens, centered on the backlight surface 810 and collimating medium 820, or offset horizontally or vertically or both. In more sophisticated applications it may have other forms such as elliptic, hyperbolic, parabolic and the like, creating one or more focusing zones. Other imaging optics may also be used to achieve the same characteristics, such as holographic foils. LCD cells 840 are located between imaging optics 830 and eye motion box 70.

Advantageously, the area of the electronic display is at least ten times larger than the eye motion box. By keeping a high area ratio between the electronic display and the viewer plane, the reduction of the reflections is made possible. Higher ratios may be designed, so as to limit the viewer plane to the region defined by the eyes of the viewer only (smaller viewer planes are not practical). It is understood that although the present invention is practical for regular size LCDs, its advantages are most apparent in LADs especially in highly reflective environments such as aircraft cockpits. A size ratio for which the present invention may be advantageous, is, for example, 1:10 and higher (denoting the ration between the area of the eye motion box and the LCD).

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein. While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system comprising:
    an electronic display comprising a backlight unit, an optical medium, a Fresnel lens, and liquid crystal display (LCD) cells,
    wherein the optical medium comprises an array of micro louvers, wherein the optical medium steers light coming from the backlight unit into light cones by limiting an exit angle of the backlight so as to meet dimensions of an eye motion box of a viewer facing said electronic display, wherein the optical medium is designed to allow a dispersion of the light cones, sufficient so that the viewing from the eye motion box allows viewing light coming of the entire display,
    wherein the Fresnel lens is located between the optical medium and the LCD cells and designed to focus the light cones to a specific distance and angle from the surface of the Fresnel lens, being the plane of the eye motion box defined by borders thereof, ensuring that said light cones do not stray away from borders defined by the eye motion box,
    wherein the center of said Fresnel lens is vertically and horizontally offset relative to the center of the electronic display, and
    wherein said electronic display is a large area display (LAD).

2. The system according to claim 1, wherein said dimensions of said eye motion box are dynamically controllable.

3. The system according to claim 1, wherein said specified dimensions of said eye motion box are controlled in real time based on predefined parameters, wherein said predefined parameters include at least one of: viewer preferences, external lighting conditions, and airplane orientation.

4. The system according to claim 1, wherein said display is a liquid crystal display (LCD).

5. The system according to claim 1, wherein the area of said display is at least 50 times larger than the area of said eye motion box.

\* \* \* \* \*